United States Patent
Lisle

(10) Patent No.: US 9,688,213 B2
(45) Date of Patent: Jun. 27, 2017

(54) AUTOMOBILE BOARD CARRIER

(71) Applicant: David B. Lisle, Wilmington, NC (US)

(72) Inventor: David B. Lisle, Wilmington, NC (US)

(*) Notice: Subject to any disclaimer, the term of this patent is extended or adjusted under 35 U.S.C. 154(b) by 0 days.

(21) Appl. No.: 14/501,002

(22) Filed: Sep. 29, 2014

(65) Prior Publication Data
US 2015/0090754 A1 Apr. 2, 2015

Related U.S. Application Data

(60) Provisional application No. 61/883,193, filed on Sep. 27, 2013.

(51) Int. Cl.
B60R 9/04 (2006.01)
B60R 9/08 (2006.01)
B60R 9/058 (2006.01)

(52) U.S. Cl.
CPC ............. B60R 9/08 (2013.01); B60R 9/058 (2013.01)

(58) Field of Classification Search
CPC ........................................... B60R 9/04
See application file for complete search history.

(56) References Cited

U.S. PATENT DOCUMENTS

| | | | | |
|---|---|---|---|---|
| 2,155,341 A * | 4/1939 | Wayne | ............... | B60R 9/058 224/324 |
| 2,834,491 A * | 5/1958 | Wells | ............... | B60P 3/1025 414/462 |
| 3,095,129 A * | 6/1963 | Kerr | ............... | B60R 9/055 224/319 |
| 3,349,977 A * | 10/1967 | Caminiti | ............... | B60R 9/06 224/314 |
| 3,709,413 A * | 1/1973 | Nelson | ............... | B60R 9/00 224/310 |
| 3,712,524 A * | 1/1973 | Ames, Sr. | ............... | 224/310 |
| 3,731,859 A * | 5/1973 | Bean, Jr. | ............... | 224/487 |
| 3,752,375 A * | 8/1973 | Weigl | ............... | 224/493 |
| 3,960,301 A * | 6/1976 | Miller | ............... | 224/318 |
| 4,039,106 A * | 8/1977 | Graber | ............... | 224/329 |
| 4,084,735 A * | 4/1978 | Kappas | ............... | 224/328 |
| 4,168,023 A * | 9/1979 | Osborn | ............... | B60R 9/04 108/44 |
| 4,632,289 A * | 12/1986 | Morissette | ............... | 224/314 |
| 5,292,045 A * | 3/1994 | Mandel | ............... | B60R 9/00 224/309 |
| 5,641,106 A * | 6/1997 | Slaughter et al. | ............... | 224/324 |
| 7,520,706 B2 * | 4/2009 | Winsor | ............... | B61D 3/18 410/121 |
| 2011/0024472 A1* | 2/2011 | Thompson et al. | ............... | 224/500 |
| 2014/0263514 A1* | 9/2014 | Kniepmann et al. | ............... | 224/559 |
| 2015/0048131 A1* | 2/2015 | Preston | ............... | 224/483 |
| 2016/0272124 A1* | 9/2016 | Goddert | ............... | B60R 9/04 |

* cited by examiner

Primary Examiner — Brian D Nash

(57) ABSTRACT

An automobile board carrier, or detachable car rack system for kayaks, surfboards, stand up padding (SUP) and other paddling equipment may be made of a lightweight metal or plastic frame with other materials to protect ear finishes while providing safe and easy attachment, detachment, and car storage. The car rack system may be adjusted according to dimensions of a vehicle and the paddling equipment. The system may include a first assembly having a first suction cup and a second assembly having a second suction cup. A strap is included to further secure the apparatus and paddling equipment to a vehicle.

1 Claim, 6 Drawing Sheets

AUTOMOBILE BOARD CARRIER

I. CLAIM OF PRIORITY

This application is a continuation patent application of and claims priority from U.S. Provisional Patent Application Ser. No. 61/883,193, filed on Sep. 27, 2013, which is incorporated by reference herein in its entirety for all purposes.

II. FIELD OF THE DISCLOSURE

The present disclosure relates generally to automobile carriers, and more particularly, to automobile carriers used to transport surfboards and paddleboards.

III. BACKGROUND

Transporting a surfboard, standup paddle board, or kayak can present challenges to paddling enthusiasts. Conventional racks may not accommodate paddling equipment of varying sizes. The racks can be cumbersome, as well as difficult and time consuming to secure to either or both an automobile and the paddling equipment. Standard size and smaller ears can be too small for or otherwise incompatible with certain rack systems.

IV. SUMMARY OF THE DISCLOSURE

In a particular embodiment, an automobile board carrier or detachable car rack system for kayaks, at stand up padding (SUP) and other paddling equipment may be made of a lightweight metal or plastic frame with other materials to protect car finishes while providing safe and easy attachment, detachment and car storage. The car rack system may be adjusted according to dimensions of a vehicle and the paddling equipment. The system may include a first assembly having a first suction cup and a second assembly having a second suction cup. A strap is included to further secure the apparatus and paddling equipment to a vehicle.

Features that characterize embodiments are set forth in the claims annexed hereto and forming a further part hereof. However, for a better understanding of embodiments, and of the advantages and objectives attained through their use, reference should be made to the drawings and to the accompanying descriptive matter.

V. BRIEF DESCRIPTION OF THE DRAWINGS

VI. DETAILED DESCRIPTION

An apparatus that is consistent with an embodiment may include an automobile board, carrier, or detachable car rack system for kayaks, surfboards, stand up padding (SUP) and other paddling equipment. The apparatus may be made of a lightweight metal or plastic frame with other materials to protect car finishes while providing safe and easy attachment, detachment, and car storage. The car rack system may be adjusted according to dimensions of a vehicle and the paddling equipment.

Figure 1:
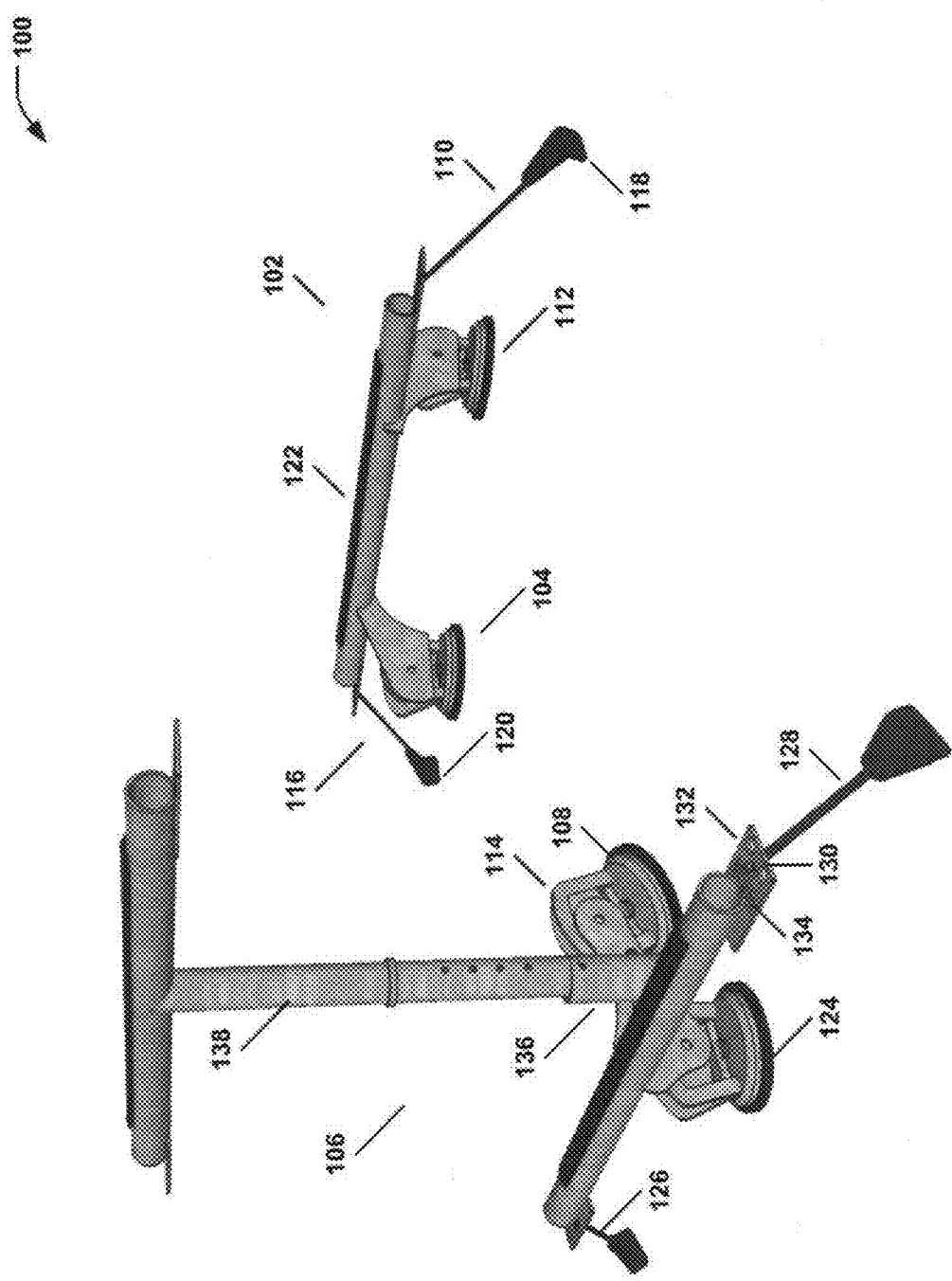
FIG. 1 is a perspective view of an embodiment of an apparatus of an automobile board carrier system that includes a first assembly having at least a first suction cup and a second assembly having at least a second suction cup, in addition to at least one strap.

Turning more particularly to the Drawings, FIG. 1 is a perspective view of an embodiment aim apparatus of an automobile board carrier system 100 that includes a first assembly 102 having a first suction cup 104 and a second assembly 106 having a second suction cup 108. According to a particular embodiment, the system 100 includes a strap 110 to further secure the apparatus and paddling equipment (not shown) to a vehicle (also not shown).

As shown in FIG. 1, the first assembly 102 may additionally include a third suction cup 112. The first suction cup 104 and the third suction cup 112 may be offset, or staggered, from one another to provide lateral stability, relative to vehicle. As with any of the suction cups described herein, an embodiment of a suction cup may be adjusted vertically and/or horizontally to facilitate suction to a vehicle surface. Moreover, the suction cups may be engaged by pressing down on a handle 114 (e.g., without using an air pump).

The first assembly 102 may additionally include a second strap 116. The first and second straps 110, 116 may be configured to be fastened to a vehicle surface to promote additional stability. To this end, a strap 110 may include a fastening end mechanism 118. Similarly, the strap 116 may include, a fastening end mechanism 120. The straps 110, 116 may include a cable, cloth, and/or elastic material, where desired. A surface 122 of the first assembly 102 may be relatively softer or cushioned to support a surface of the paddling equipment.

The second assembly 106 may include a fourth suction cup 124, which may be generally aligned with the second suction cup 114. Straps 126, 128 may attach to the second assembly 106 to provide additional stability. As shown in FIG. 1, the strap 128 may attach to the second assembly 106 via an aperture 110 in a plate 132 that is fastened to the second assembly 106. As shown more clearly in the drawings to follow, slits 134 in the plate 132 may receive straps or other fasteners used to secure the paddling equipment to the second assembly 106.

An extension support 136 of the second assembly 106 may be configured to held an extension section 138. Holes in the extension support 136 may be aligned with corresponding holes in the extension section to allow a pin to pass through and secure the extension section 138 into place. As shown in drawings to follow, the extension section may be selectively included, in the configuration of the second assembly 106 to accommodate and support relatively longer padding equipment.

Figure 2:
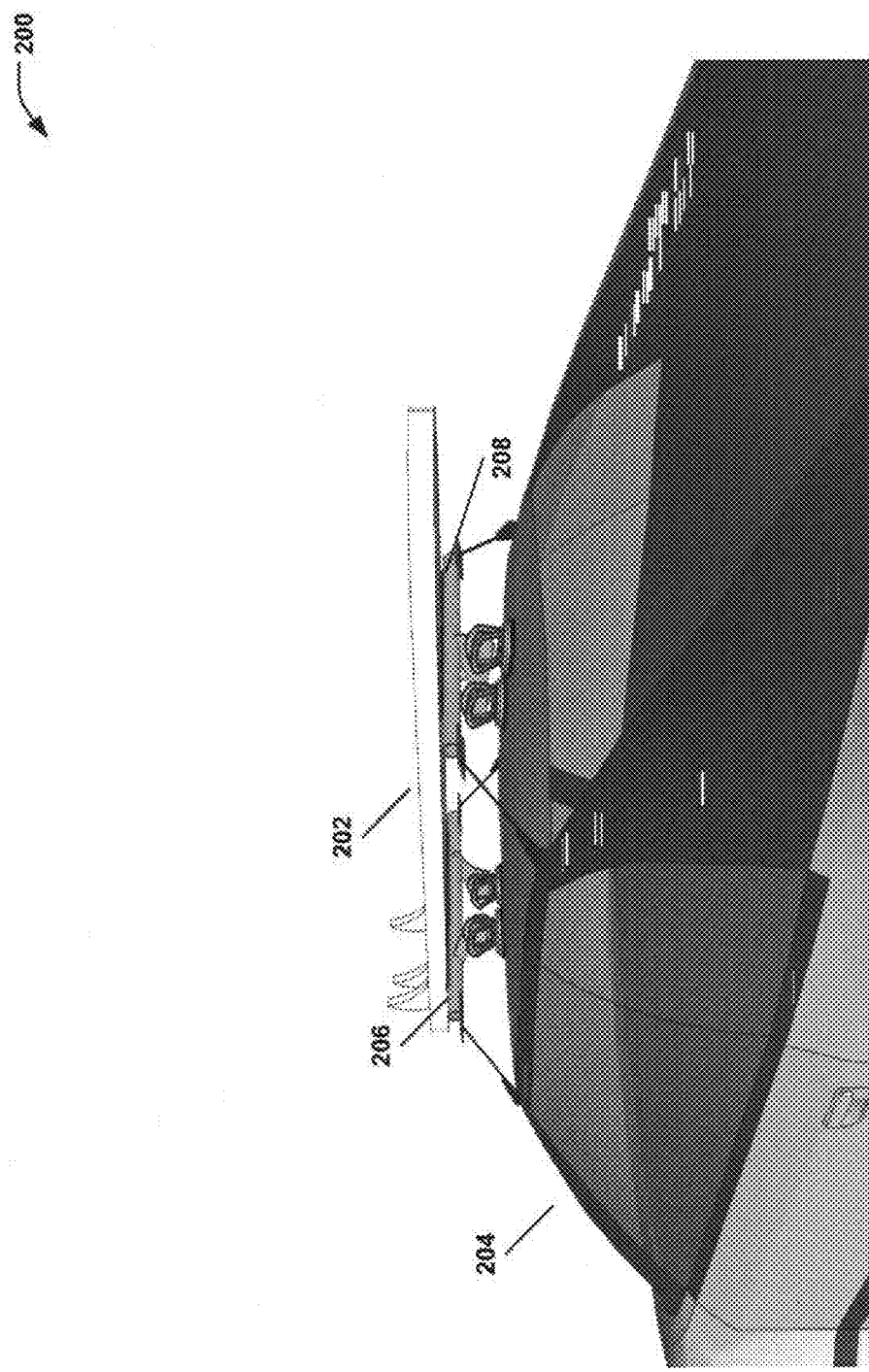
FIG. 2 is a perspective view of an embodiment of an automobile board carrier system configured to carry a surfboard on top of a vehicle.

FIG. 2 is a perspective view of an embodiment of an automobile board carrier system 200 configured to carry a surfboard 202 on top of a vehicle 204. The system 200 may be the same as the embodiment shown in FIG. 1 without use of the extension section 138. As such the system 200 may include a first assembly 206 that is similar to the first assembly 102 of FIG. 1. A second assembly 208 may be similar to the second assembly 106 of FIG. 1.

Figure 3:
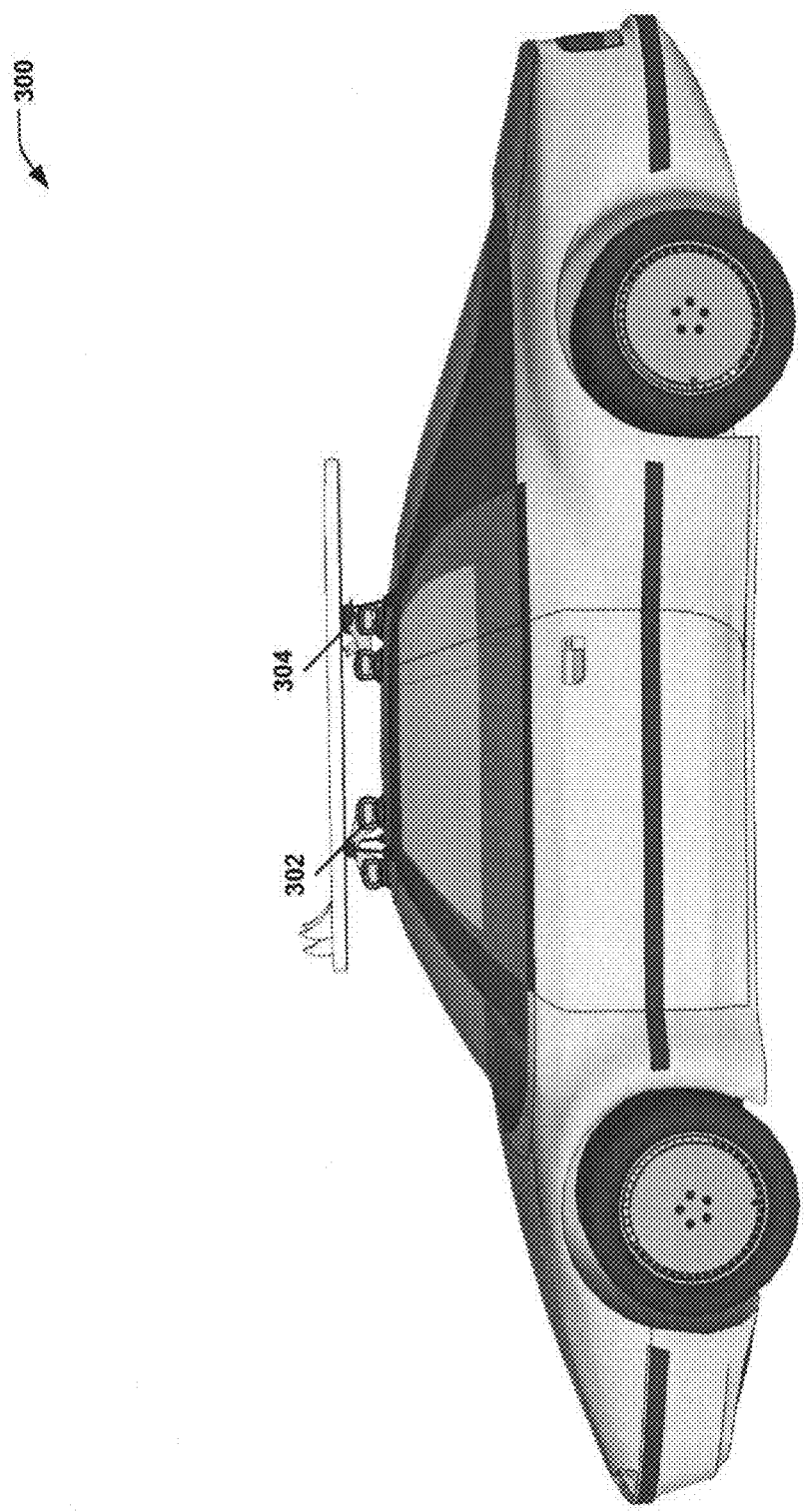
FIG. 3 is a perspective side view of an embodiment or automobile board carrier system of FIG. 2.

FIG. 3 is a perspective side view of an embodiment of an automobile board carrier system 300 similar or identical to that shown in FIG. 2. As such, the system 300 may include a first assembly 302 that is similar to the first assembly 206 of FIG. 2. A second assembly 304 may be similar to the second assembly 208 of FIG. 2.

Figure 4:
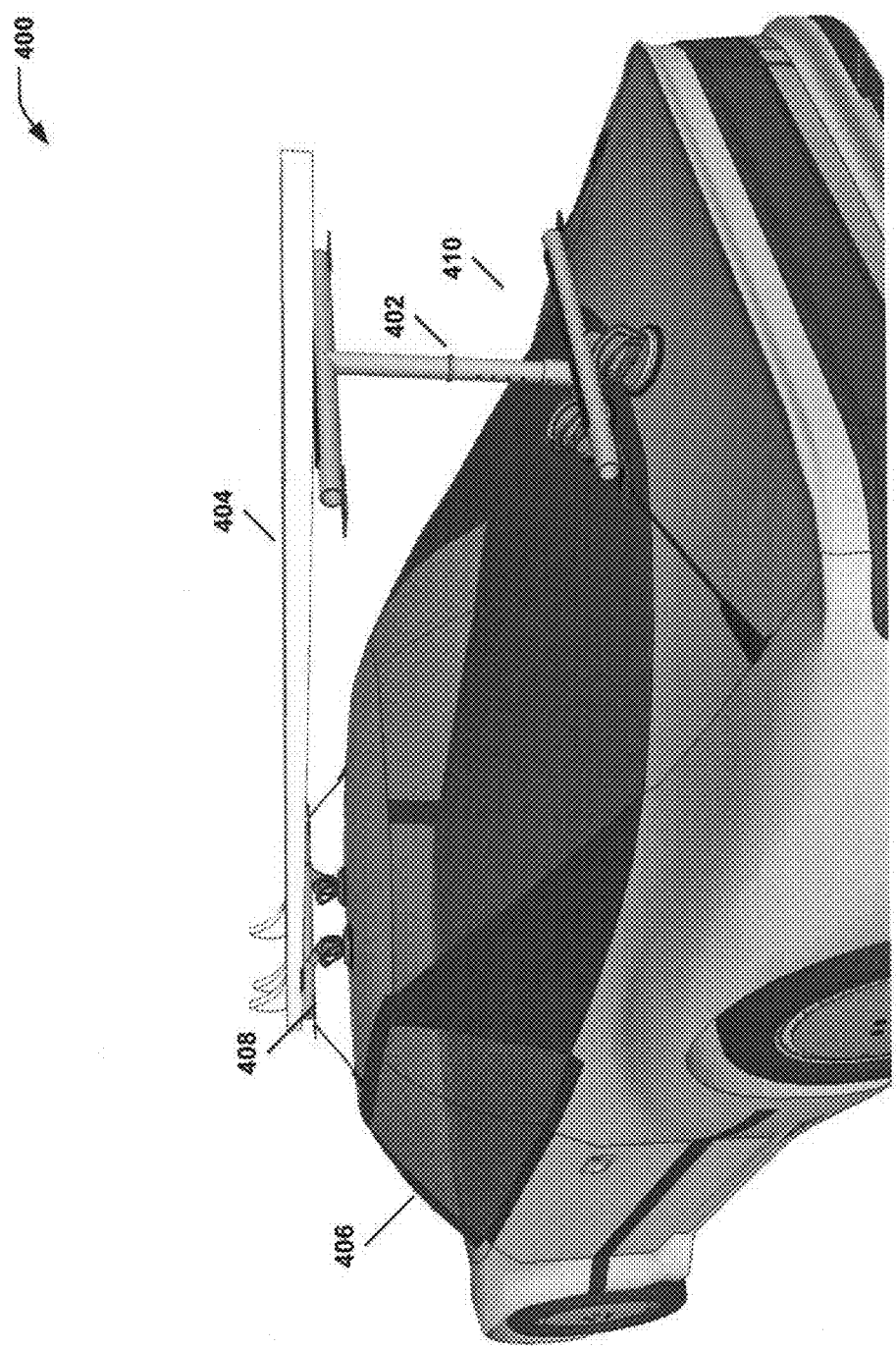
FIG. 4 is a perspective view of an embodiment of an automobile board carrier system having an extension section configured to carry a paddleboard on to of a vehicle.

FIG. 4 is a perspective view of an embodiment of an automobile board carrier system 400 having an extension section 402 configured to carry a paddleboard 404 on top of a vehicle 406. The system 400 may include a first assembly 406 that is similar to the first assembly 102 of FIG. 1. A second assembly 410 may be similar to the second assembly 106 of FIG. 1.

Figure 5:
FIG. 5 is a perspective view of the first assembly of the automobile board carrier system of FIG. 1.
Figure 6:
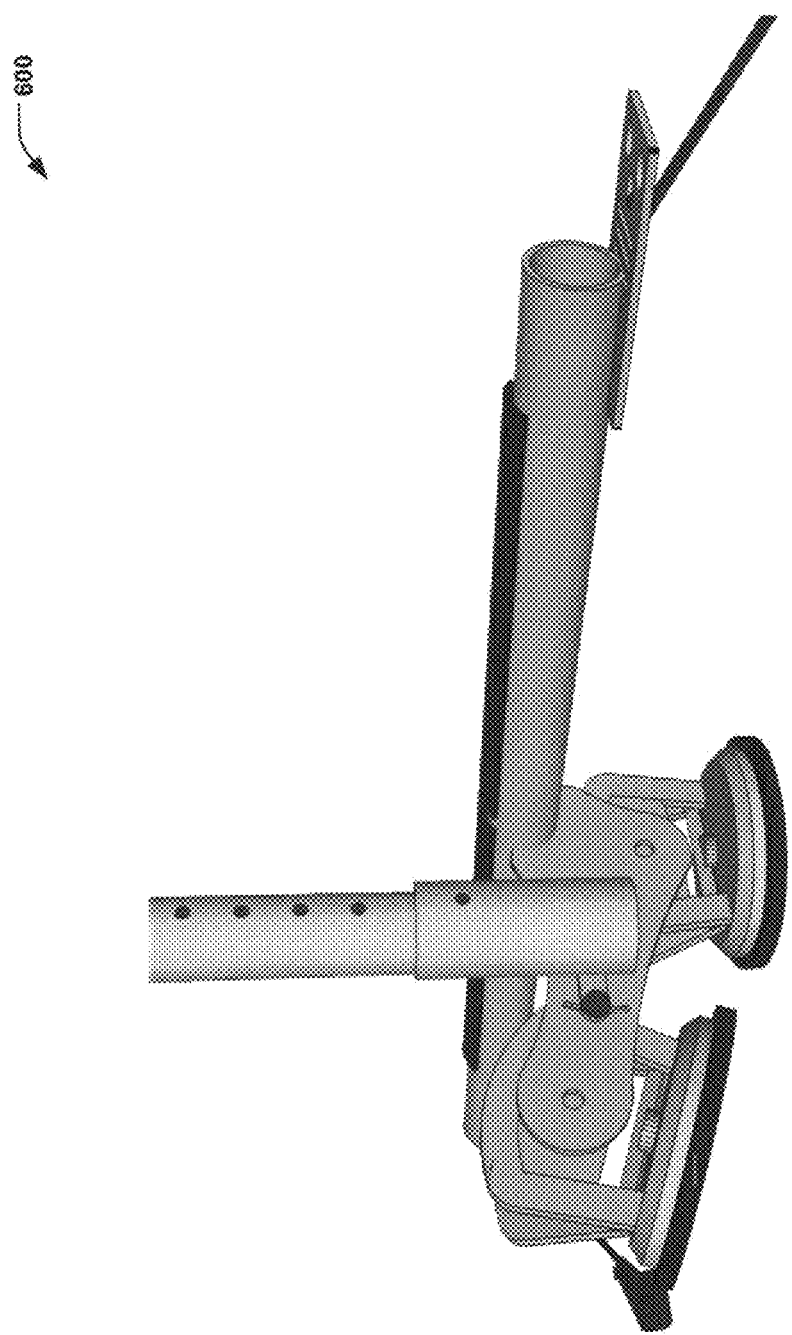
FIG. 6 is a perspective view of the second assembly of the automobile board carrier system of FIG. 1.

FIG. 5 is a perspective view of an apparatus 500 similar to the first assembly 102 of the automobile board carrier system 100 of FIG. 1. FIG. 6 is a perspective view of an apparatus 600 similar to of the second assembly 106 of the automobile board carrier system 100 of FIG. 1.

While the present embodiments have been described in detail, it is not the intention of the Applicant to restrict, or any way limit the scope of the appended claims to such detail. The embodiments in their broader aspects are therefore not limited to the specific details, representative apparatus, methods, and illustrative examples shown and described. Accordingly, departures may be made from such details without departing from the scope of Applicant's general inventive concept.

The invention claimed is:
1. An apparatus, comprising:
a first rack piece comprising:
   a first load bar;
     a first suction cup positioned on a first side of the first load bar;
     a second suction cup positioned on an opposing side of the first load bar, wherein the first and second suction cups are independently pivotal; and
     an extension piece having a distal end and a proximal end, wherein the extension piece is attached to the opposing side of the first load bar at the proximal end and attached to the second pivotal cup at the distal end; and
a second rack piece, physically separated from the first rack piece, the second rack piece comprising:
   a second load bar;
   a support bar;
     a third suction cup positioned on a first side of the support bar;
     a fourth suction cup positioned on an opposing side of the support bar, wherein the third and fourth suction cups are independently pivotal; and
     a telescoping mechanism attached to the second load bar and to the support bar.

\* \* \* \* \*